(12) United States Patent
Uyeno et al.

(10) Patent No.: US 10,148,056 B2
(45) Date of Patent: Dec. 4, 2018

(54) RING AMPLIFIER FOR EXTENDED RANGE STEERABLE LASER TRANSMITTER AND ACTIVE SENSOR

(71) Applicant: Raytheon Company, Waltham, MA (US)

(72) Inventors: Gerald P. Uyeno, Tucson, AZ (US); Sean D. Keller, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 231 days.

(21) Appl. No.: 15/186,957

(22) Filed: Jun. 20, 2016

(65) Prior Publication Data
US 2017/0365970 A1    Dec. 21, 2017

(51) Int. Cl.
| | |
|---|---|
| *H01S 3/00* | (2006.01) |
| *G01S 17/42* | (2006.01) |
| *G01S 7/481* | (2006.01) |
| *H01S 3/23* | (2006.01) |
| *H01S 3/06* | (2006.01) |
| *H01S 3/101* | (2006.01) |

(Continued)

(52) U.S. Cl.
CPC .......... *H01S 3/0071* (2013.01); *G01S 7/4814* (2013.01); *G01S 7/4817* (2013.01); *G01S 17/42* (2013.01); *H01S 3/06* (2013.01); *H01S 3/2308* (2013.01); *G02F 1/1326* (2013.01); *H01S 3/083* (2013.01); *H01S 3/101* (2013.01); *H01S 3/2325* (2013.01); *H01S 2301/02* (2013.01)

(58) Field of Classification Search
CPC ........ H01S 3/0071; H01S 3/2308; H01S 3/06; H01S 3/101; H01S 3/2325; H01S 2301/02; H01S 3/083; G01S 7/4814; G01S 17/42; G01S 7/4817; G02F 1/1326; G02F 1/295; G02F 1/29; G02F 2001/291

See application file for complete search history.

(56) References Cited

U.S. PATENT DOCUMENTS

| | | | |
|---|---|---|---|
| 4,783,789 A | * | 11/1988 | Higgins ................ B01J 19/121 219/121.76 |
| 5,747,720 A | | 5/1998 | Schnurr et al. |

(Continued)

OTHER PUBLICATIONS

Dergachev et al., "A CW side-pumped Yb:S-FAP laser," OSA TOPS vol. 68, Advanced Solid-State Lasers Martin E. Fermann and Larry R. Marshall, eds. © 2002 Optical Society of America.

(Continued)

*Primary Examiner* — Que T Le
*Assistant Examiner* — Jennifer Bennett
(74) *Attorney, Agent, or Firm* — Eric A. Gifford

(57) ABSTRACT

A ring amplifier amplifies one or more spot-beams that scan a circular pattern in a two-dimensional FOV to extend the range of range steerable laser transmitter or an active situational sensor. Mechanical, solid-state or optical phase array techniques may be used to scan the spot-beam(s) in the circular pattern. Mirrors are preferably positioned to redirect the spot-beams to enter and exit the ring amplifier through sidewalls to amplify the spot-beam and return it along a path to scan the circular pattern. For efficiency, the pumps and thermal control may be synchronized to the circular scan pattern to only pump and cool the section of gain medium in which the spot-beam is currently scanned and the next section of gain medium in the circular scan pattern.

20 Claims, 10 Drawing Sheets

SECTION A-A

(51) Int. Cl.
  *G02F 1/13* (2006.01)
  *H01S 3/083* (2006.01)

(56) References Cited

U.S. PATENT DOCUMENTS

| | | |
|---|---|---|
| 6,130,783 A | 10/2000 | Yagi et al. |
| 7,135,672 B2 | 11/2006 | Land |
| 7,969,558 B2 | 6/2011 | Hall |
| 8,767,190 B2 | 7/2014 | Hall |
| 2002/0057725 A1* | 5/2002 | Peressini ............... H01S 3/0941 372/92 |
| 2002/0105997 A1* | 8/2002 | Zhang ................... H01S 3/0941 372/70 |
| 2002/0172253 A1* | 11/2002 | Vetrovec ................ H01S 3/042 372/95 |
| 2010/0108913 A1* | 5/2010 | Ershov ................... H01S 3/225 250/492.1 |

OTHER PUBLICATIONS

Brignon et al., "Large-field-of-view, high-gain, compact diode-pumped Nd:YAG amplifier," Sep. 15, 1997 / vol. 22, No. 18 / Optics Letters.

* cited by examiner

SECTION A-A

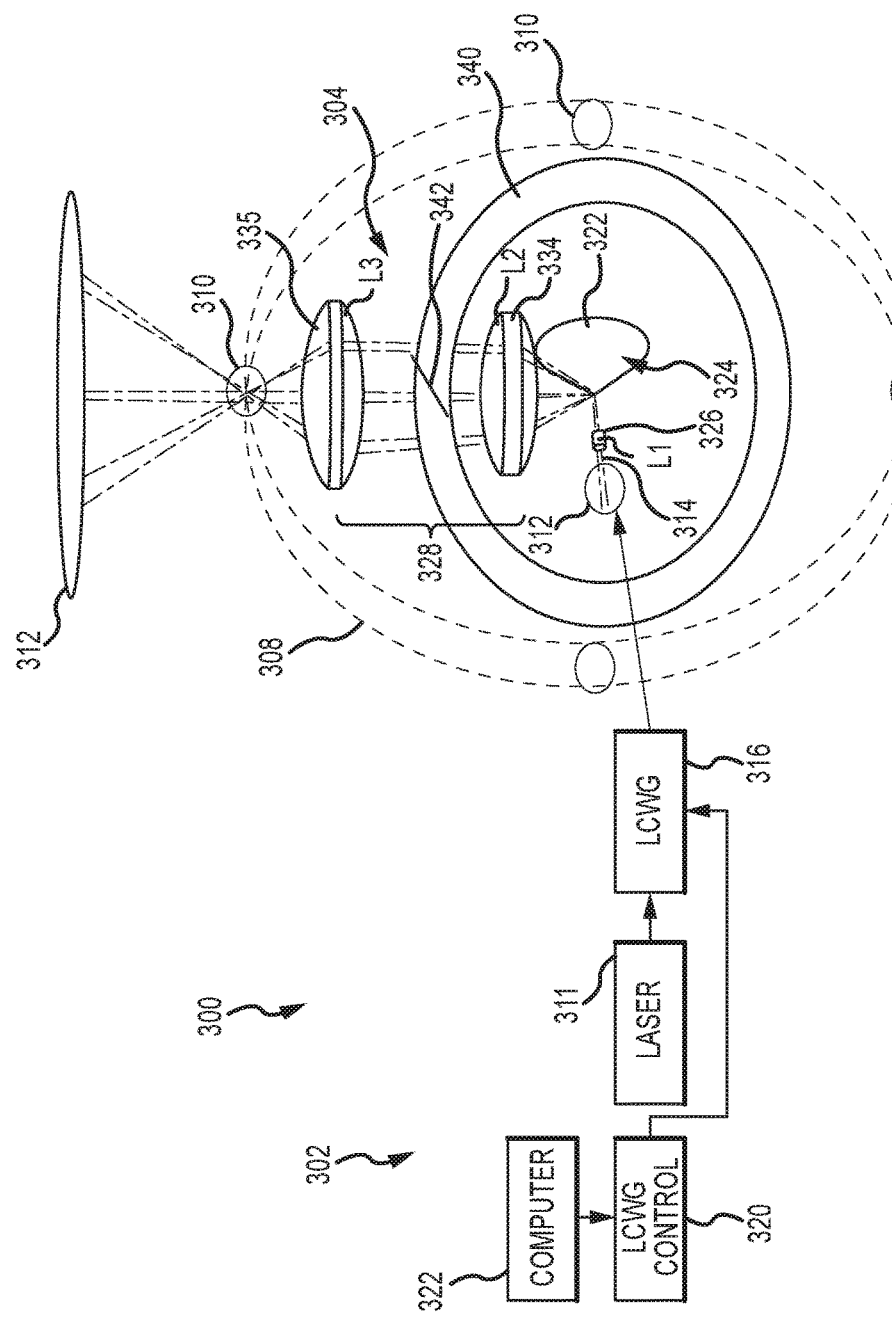

SECTION A-A

SECTION B-B

RING AMPLIFIER FOR EXTENDED RANGE STEERABLE LASER TRANSMITTER AND ACTIVE SENSOR

RELATED APPLICATIONS

This application is related to U.S. patent application entitled "Electrically Operated Propellants", Ser. No. 14/748,928 filed on Jun. 24, 2015, the entire contents of which are incorporated by reference.

BACKGROUND OF THE INVENTION

Field of the Invention

This invention relates to steerable laser transmitters and active situational awareness sensors, and more particularly to the use of a ring amplifier to extend the range of the steerable laser transmitter or active situational awareness sensor in a 360° field-of-view (FOV).

Description of the Related Art

Situational awareness is the perception of environmental elements with respect to time or space, the comprehension of their meaning, and the projection of their status after some variable has changed, such as time, or some other variable, such as a predetermined event. Situational awareness is critical in complex, dynamic systems such as aviation, air traffic control, ship navigation, collission avoidance, object targeting etc.

Situational awareness sensors may be passive or active. Passive sensors use a detector and ambient energy to detect and track objects in the sensor's FOV. Active sensors use a laser to illuminate objects in the FOV and a detector to detect reflected energy. The active sensor may be configured to produce an intensity image or a range map of the illuminated object. Active sensors have the advantages of illuminating a target with a laser and being able to provide range information. However, lasers can be large and expensive and raise the overall "SWaP-C" (size, weight, power and cost) of the sensor.

One type of active sensor uses flash illumination to simultaneously illuminate the entire FOV and a pixelated detector to detect reflected energy. This approach requires a laser with a lot of power, hence size, weight and cost, to provide the requisite energy density over the FOV to detect objects at typical distances. Flash illumination also produces atmospheric backscatter that reduces the signal-to-noise ratio (SNR) of the detected objects. Flash illumination does have the benefit of no moving parts.

Another type of active sensor uses a single laser to generate a collimated spot-beam. A mirror is physically rotated to scan the collimated spot-beam over a 360 degree horizontal FOV. The entire sensor may be actuated up and down to scan a desired vertical FOV. A single detector senses a reflected component of the spot-beam. This approach can use a less powerful laser and reduces atmospheric backscattering but is mechanically scanned. Mechanical scanning has a large SWaP-C due to the size of the mechanical structures and motors.

Velodyne Lidar offers a suite of LIDAR sensors that provide a 360 degree horizontal FOV and a 30-40 degree vertical FOV for real-time autonomous navigation, 3D mobile mapping and other LIDAR applications (U.S. Pat. Nos. 7,969,558 and 8,767,190). The LIDAR sensor includes a base, a housing, a plurality of photon transmitters and photon detectors contained within the housing, a rotary motor that rotates the housing about the base, and a communication component that allows transmission of signals generated by the photon detectors to external components. The photon transmitters and detectors of each pair are held in a fixed relationship with each other. The rotary component includes a rotary power coupling configured to provide power from an external source to the rotary motor, the photon transmitters, and the photon detectors. This approach uses may small emitter/detector pairs but requires mechanical rotation to scan the horizontal FOV.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an extended range steerable laser transmitter and an active situational sensor. A ring amplifier amplifies one or more spot-beams that scan a circular pattern in a two-dimensional FOV. The laser device (transmitter or sensor) may be positioned in any horizontal or vertical direction and may rapidly scan a 360° horizontal FOV with a specified vertical FOV perpendicular to the plane of the scan. The device may also scan any circular portion of the FOV, jump between multiple discrete objects per frame, vary the dwell time on an object or compensate for other external factors to tailor the scan to a particular application or changing real-time conditions.

In different embodiments, mechanical, solid-state or optical phase array (OPA) techniques may be used to scan the spot-beam(s) in the circular pattern. In a solid-state embodiment, a LCWG steers the spot-beam around an axis and a conic mirror redirects the spot-beam away from the axis to scan the circular pattern. In an OPA embodiment, a plurality of channels extend radially from a center. Each channel includes a single chip on which is integrated an OPA that comprises an array of solid-state laser emitters. The phase between adjacent emitters is controlled to control an exit angle of the spot-beam to scan a portion of the FOV.

In different embodiments, mirrors are positioned to redirect the spot-beam(s) to enter and exit the ring amplifier through sidewalls to amplify the spot-beam and return it along a path to scan the circular pattern.

In different embodiments, the pumps and thermal control may be synchronized to the circular scan pattern to only pump and cool the section of gain medium in which the spot-beam is currently scanned and the next section of gain medium in the circular scan pattern.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 5 illustrates an embodiment of a LCWG steered situational sensor including optics L1, L2 and L3 for amplifying and scanning the redirected spot-beam through discrete apertures.

DETAILED DESCRIPTION OF THE INVENTION

The present invention provides a ring amplifier that amplifies one or more spot-beams that scan a circular pattern in a two-dimensional field-of-view (FOV) to extend the range of range steerable laser transmitter or an active situational sensor. Mechanical, solid-state or optical phase array techniques may be used to scan the spot-beam(s) in the circular pattern. Mirrors are preferably positioned to redirect the spot-beams to enter and exit the ring amplifier through sidewalls to amplify the spot-beam and return it along a path to scan the circular pattern. For efficiency, the pumps and thermal control may be synchronized to the circular scan pattern to only pump and cool the section of gain medium in which the spot-beam is currently scanned and the next section of gain medium in the circular scan pattern.

The device (laser or sensor) may rapidly scan a circular pattern in a 360° horizontal FOV with a specified vertical FOV or any portion thereof, jump discretely between multiple specific objects per frame, vary the dwell time on an object or compensate for other external factors to tailor the scan to a particular application or changing real-time conditions. The transmission axis may be positioned in any horizontal or vertical direction and the sensor may rapidly scan a 360° field of view in the plane of the transmission axis with a specified vertical field of view perpendicular to the plane of the scan. The plane of the transmission axis is referred to as the "horizontal plane" in the remainder of this document, however, this plane does not have to be oriented horizontal (perpendicular to the direction of gravity), for the sensor to function. The transmitter can be used to provide object intensity or ranging in complex, dynamic systems such as aviation, air traffic control, ship navigation, robotics, unmanned vehicles such as unmanned ground vehicles (UGVs) (e.g., a drone) or driverless cars, collission avoidance, object targeting, underwater (green laser) applications, etc.

Figure 1:
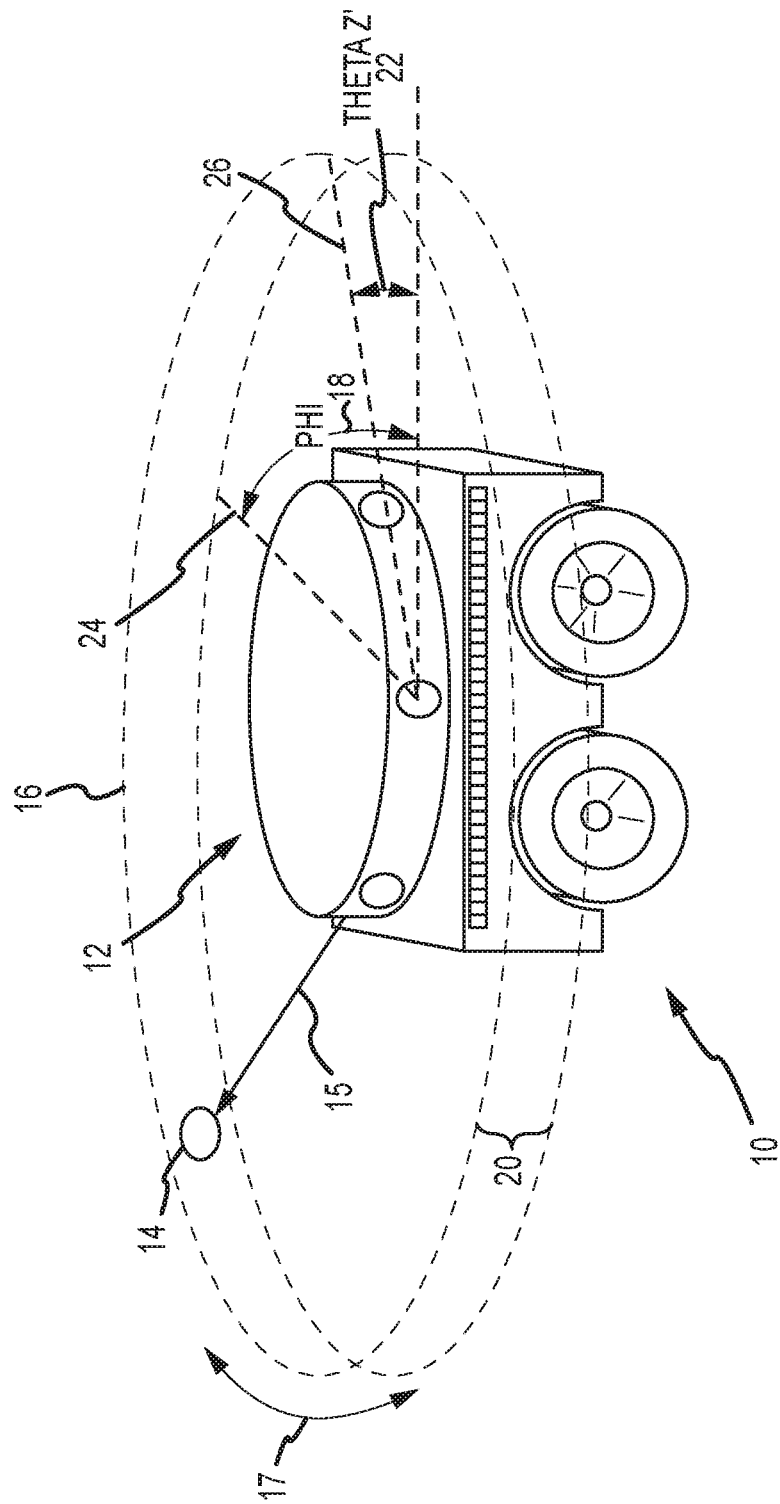
FIG. 1 is a diagram of an extended range steerable laser transmitter and situational awareness sensor of the present invention.

Referring now to FIG. 1, in an embodiment an unmanned ground vehicle (UGV) 10 is outfitted with an extended range steerable laser transmitter and a detector that form an active situational awareness sensor (the "device") 12. Device 12 is capable of scanning a collimated spot-beam 14 along a transmission axis 15 in a circular pattern 17 over a 360° FOV 16 in angle Phi 18 and a defined FOV 20 in angle Theta Z' 22, typically 2 to 20 degrees. In a specific configuration, the FOVs in angle Phi 16 and Theta Z' 18 correspond to horizontal and vertical FOV, respectively. In other embodiments, device 12 may be configured to scan an entire circular pattern over a 360° FOV or a portion of the circular pattern for a reduced FOV. For example, in some applications the device may need to only scan half the circular pattern for a forward 180° FOV. Or the device may scan limited arc of the circular pattern to address a local FOV.

Device 12 comprises one or more lasers (CW or pulsed) configured to generate one or more collimated spot-beams 14, one or more beam steerers responsive to command signals to steer the one or more spot-beams to scan circular pattern 17 in two-dimensional FOV 16 and a ring amplifier comprising one or more pumps configured to pump a gain medium in the form of a ring. The ring amplifier is configured such that the one or more spot-beams pass through the amplifier's optically-pumped gain medium one or more times to amplify the one or more spot beams while preserving the steering of the one or more spot-beams over the FOV 16. The sensor configuration includes one or more detectors responsive to the wavelength of the transmitted spot-beam. One or more apertures 26 are formed in a housing 24 to facilitate scanning spot-beam 14 over the FOV. To scan the 360° FOV 16, the housing may have a single continuous ring aperture or multiple discrete apertures placed every 360/N degrees.

The laser (CW or pulsed) is configured to generate a collimated spot-beam 14 along an optical axis that is oriented in the Z direction. The LCWG is oriented along the optical axis and is responsive to command signals from the LCWG controller to steer the spot-beam 14 about the optical axis in two dimensions. The fixed mirror has a conical shape oriented along the optical axis and redirects the spot-beam 14 to a location Phi and Theta Z' in the FOV. The various optical components are configured, at least in part, based on the particular aperture configuration of the sensor to scan the spot-beam 14 over the FOV. The detector is configured to sense a reflected component of the spot-beam, which can be processed to provide intensity or range.

Figure 2A:
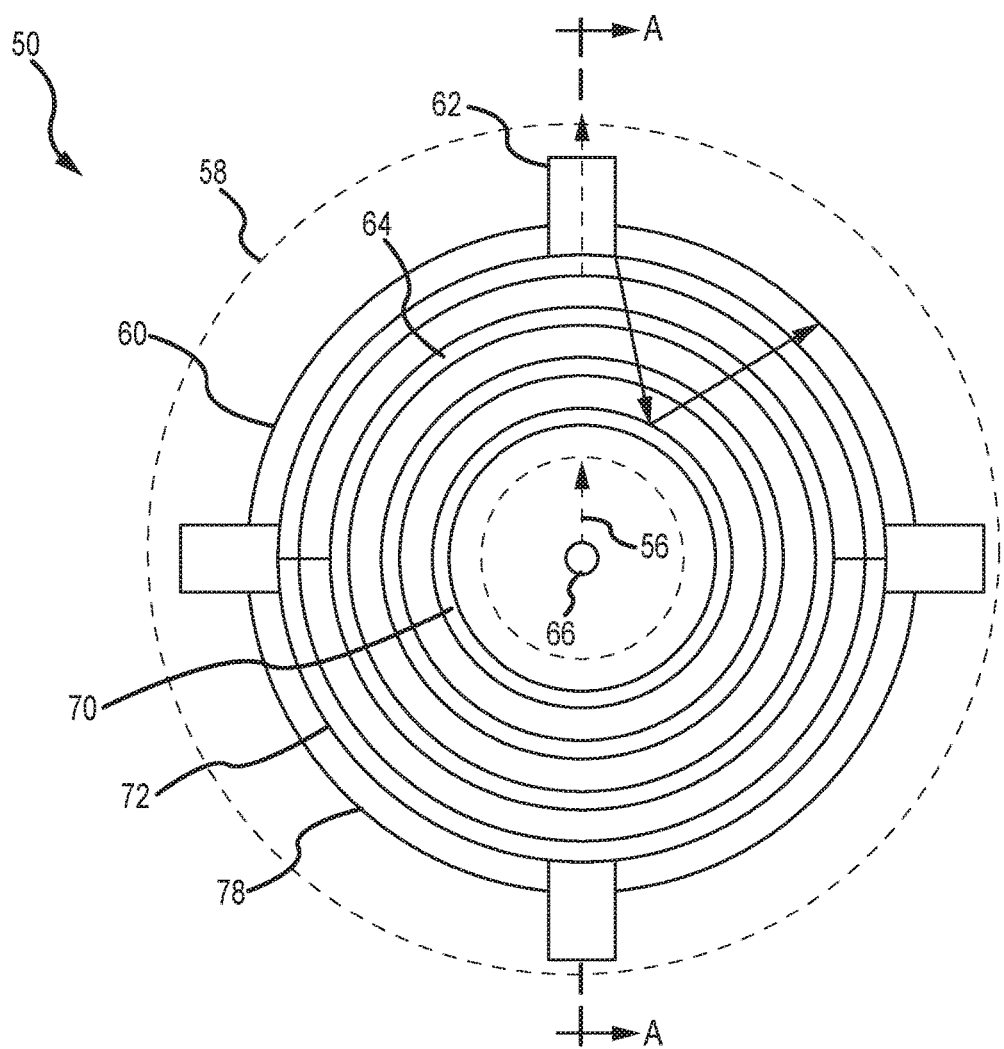
FIGS. 2a and 2b are top and side views of an embodiment of a steerable laser including a ring amplifier for amplifying one or more spot-beams that scan a circular pattern in a 360° FOV.
Figure 2B:
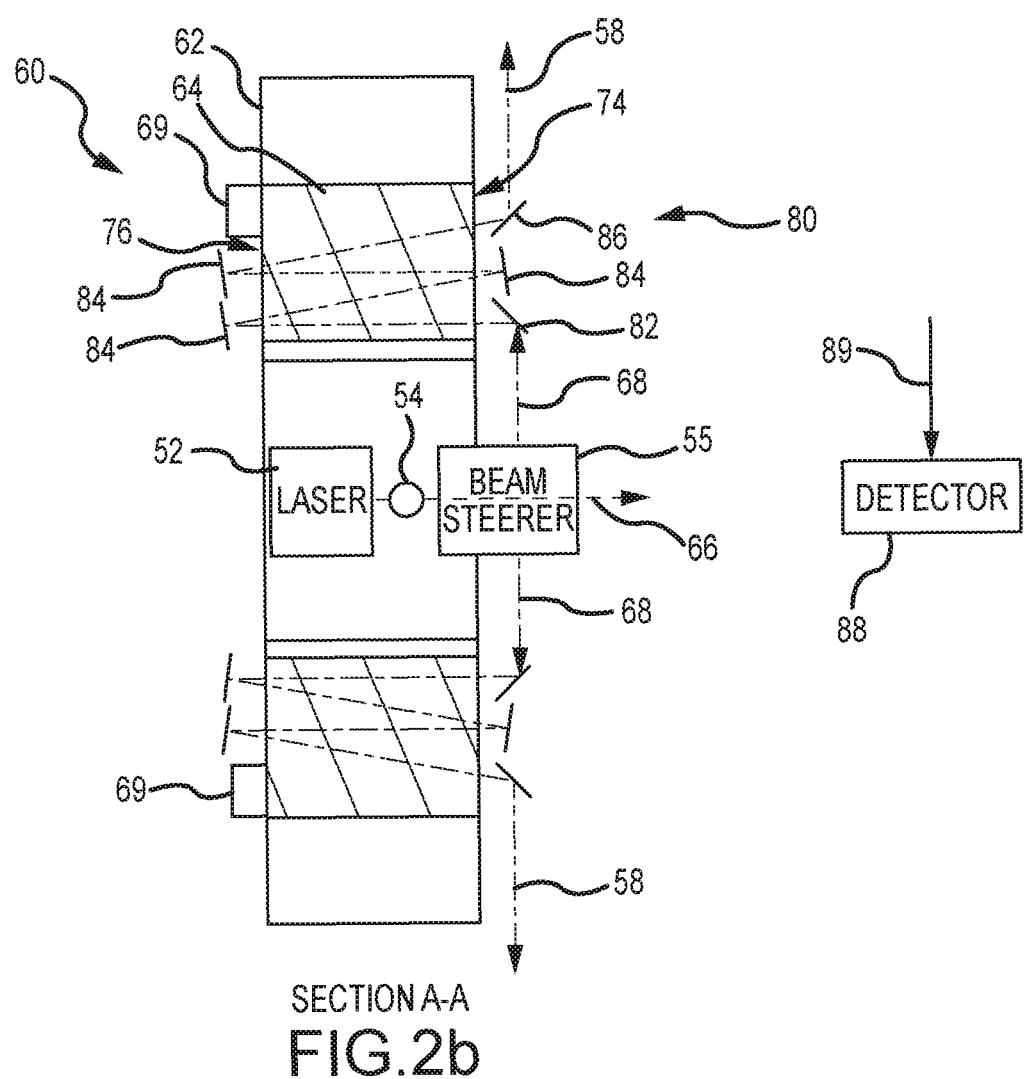

Referring now to FIGS. 2a and 2b, an embodiment of a laser device 50 includes a laser 52 configured to generate a collimated spot-beam 54, a beam steerer 55 responsive to command signals to steer collimated spot-beam 54 to scan a circular pattern 56 in a 2D FOV 58, and a ring amplifier 60 including one or more pumps 62 configured to pump a gain medium 64 in the form of a ring around a first axis 66. Collimated spot-beam 54 is suitably steered along a transmission axis 68 in a plane substantially normal to first axis 66 to scan circular pattern 56. The surfaces at the inner and outer diameters of the ring are suitably reflective to reflect the pump signal and uniformly energize the gain medium. Ring amplifier 60 is configured such that the spot-beam 54 passes through the optically-pumped gain medium 64 one or more times to amplify spot-beam 54 while preserving the steering of the one or more spot-beams over the FOV 58. Equivalently, the exit beam may be parallel to the entrance beam. The device may be configured to generate and steer multi-spots beams over the FOV. A spot-beam cannot be formed and remain perfectly collimated throughout an optical system. As used herein, a collimated spot-beam is at least collimated to a first order as would be understood by those skilled in the relevant art.

In different embodiments, mechanical, solid-state or optical phase array (OPA) techniques may be used to generate and scan the spot-beam 54 in the circular pattern. In a mechanical embodiment, a scanning mirror is used to redirect the spot-beam to scan the circular pattern. In a solid-state embodiment, a LCWG steers the spot-beam around an axis and a conic mirror redirects the spot-beam away from the axis to scan the circular pattern. In an OPA embodiment, a plurality of channels extend radially from a center. Each channel includes a single chip on which is integrated an OPA that comprises an array of solid-state laser emitters. The phase between adjacent emitters is controlled to control an exit angle of the spot-beam to scan a portion of the circular pattern and 2D FOV. See Jie Sun et al., "Large-scale nanophotonic phased array" 10 Jan. 2013, Vol. 493, NATURE, pp. 195-199, which is hereby incorporated by reference.

A cladding 69 is suitably placed around gain medium 64 to suppress amplified spontaneous emission (ASE). The cladding is suitably placed anywhere on the gain medium that the spot-beam 54 does not enter or exit. The cladding can be placed on the inner or outer diameter surfaces 70 and 72 or sidewalls 74 and 76 of the ring.

An active thermal controller 78 may be placed around gain medium 64 to cool the gain medium and maintain a stable temperature. As will be described subsequently, the active thermal controller may be segmented and synchronized to the circular scan of the spot-beam and pumping of the gain medium for improved efficiency.

A system of mirrors 80 is configured to redirect spot-beam 54 so that the spot-beam passes through the optically-pumped gain medium 64 one or more times to amplify spot-beam 54 while preserving the steering of the one or more spot-beams to scan circular pattern 56 over the FOV 58. Gratings may be used as the individual mirrors.

In an embodiment, an entrance mirror 82 is configured to redirect the spot-beam 54 parallel to the first axis 66 through a first sidewall 74 of the gain medium 64. A plurality of mirrors 84 is configured to redirect the spot-beam 54 to pass back-and-forth through the gain medium 64 between said second and first sidewalls 76 and 74 multiple times to amplify the spot-beam 54 before exiting the first sidewall 74 parallel to the first axis 66. An exit mirror 86 is configured to redirect the amplified spot-beam 54 along the path to scan the circular pattern 56. Equivalently, the exit path may be parallel to the entrance path to scan the circular pattern. The sidewalls of the gain medium are flat, hence do not have optical power that would degrade the collimation of spot-beam 54.

A detector 88 is configured to sense a reflected component 89 of the spot-beam 54 at the output wavelength. The optical system is configured such that the reflected component does not return through the amplifier, which would amplify any noise and potentially damage the amplifier. The reflected component 89 may be processed to provide an intensity of the illuminated object or a range to the illuminated object.

In an alternate embodiment, the surfaces at the inner and outer diameters of the ring are partially transmissive and partially reflective at the transmission wavelength. The ring is positioned in the plane of circular scan pattern 56 so that spot-beam 54 enters through the surface 70 at the inner diameter, passes back-and-forth through the optically-pumped gain medium 64 multiple times and exits through the surface 72 at the outer diameter along the same path to scan the circular pattern. Surfaces 74 and 76 are highly reflective. A potential drawback to this configuration is that the inner and outer diameters are curved, and thus exhibit optical power, which may degrade the collimation of spot-beam 54.

Figure 3:
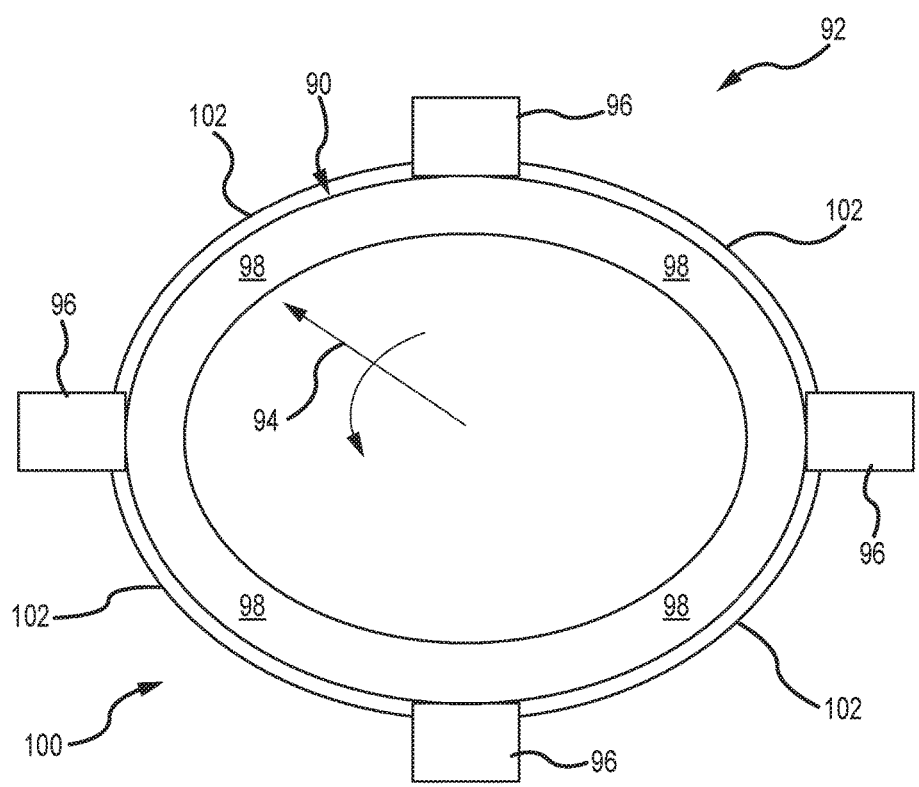
FIG. 3 is a diagram illustrating synchronized pumping and thermal cooling of the ring amplifier's gain medium with the circular scan of the spot-beam.

Referring now to FIG. 3, to enhance power efficiency without sacrificing performance, an optical gain medium 90 of a ring amplifier 92 may be optically-pumped and possibly thermally cooled in sync with the circular scan pattern of a collimated spot-beam 94. In this embodiment, four optical pumps 96 are spaced around the circumference of gain medium 90 to pump respective portions 98 of the gain medium. All of the pumps 96 may continuously pump the gain medium 90. Alternately, the pumps can be controlled to only pump the portion of the gain medium through which the spot-beam 94 is current passing and the portion of the gain medium through which the spot-beam 94 will next pass to ensure the gain medium is energized to scan the circular pattern. In this way, only 50% of the pumps are on at any one time. If a greater number of pumps are positioned about the ring, the percentage will drop accordingly. The tradeoff is cost of the pumps and space.

Typically, ring amplifier 92 will require active thermal control to maintain uniform performance. An active thermal controller 100 is configured to cool gain medium 90 and maintain a constant temperature. The active thermal controller 100 may be configured to continuously cool the entire ring amplifier. Alternately, if the operation of the pumps 96 is synchronized to the circular scan pattern of spot-beam 94 the active thermal controller can be segmented into four sections 102 spaced around the circumference of the ring of gain medium in an alternating arrangement between the plurality of pumps 96. The active thermal control sections 102 are responsive to cool only the pumped first and second portions 98 of the gain medium 90 as the spot-beam 94 scans the circular pattern. As before, only 50% of the active cooling is engaged at any one time.

Figure 4:
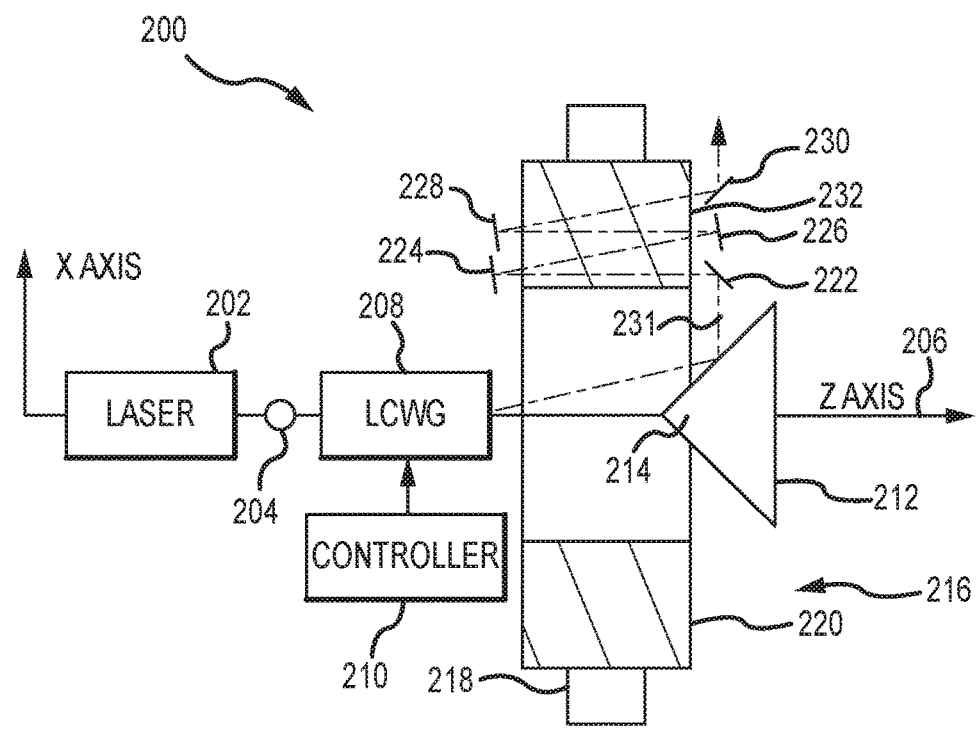
FIG. 4 is a side view of an embodiment of the ring amplifier including a liquid crystal waveguide (LCWG) and a conic mirror to scan a spot-beam in a circular pattern.
Figure 6A:
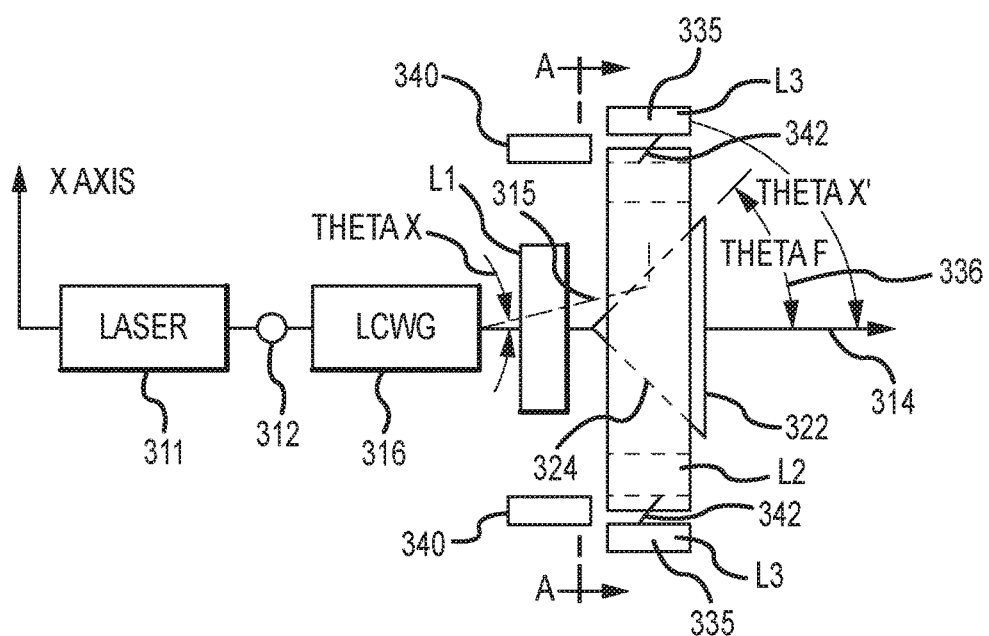
FIGS. 6a-d are top, side, section A-A and section B-B views of the situational awareness sensor of FIG. 5.
Figure 6B:
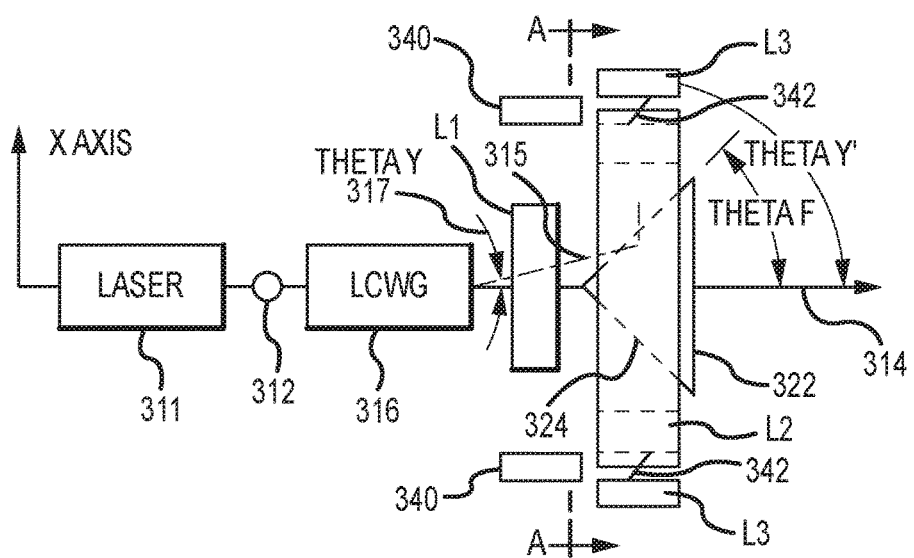
Figure 6C:
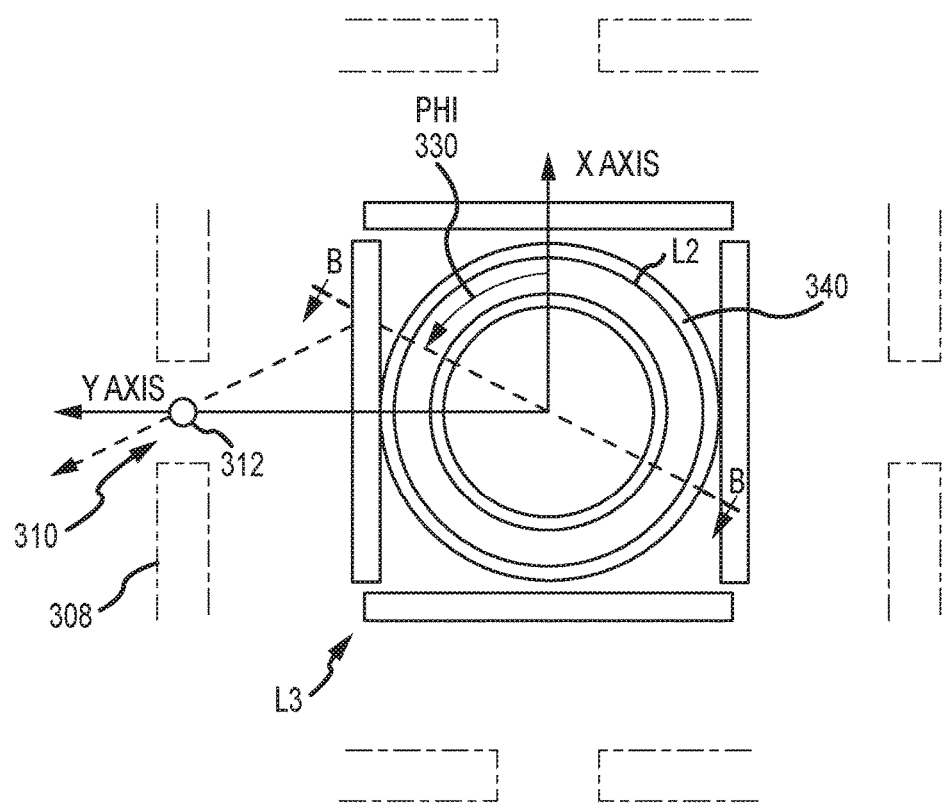
Figure 6D:
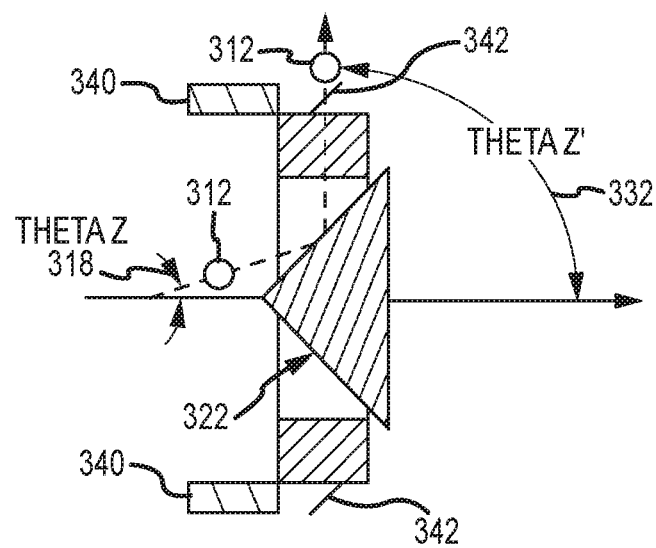

Referring now to FIG. 4, an embodiment of an extended range steerable laser transmitter 200 includes a laser 202 configured to generate a collimated spot-beam 204 at an input wavelength along an optical axis 206 (e.g., the Z-axis). A liquid crystal waveguide (LCWG) 208 positioned along the optical axis is responsive to command signals to steer the spot-beam 204 at the input wavelength in two-dimensions (e.g., a circle) about the optical axis 206. A controller 210 is configured to issue command signals to the LCWG to steer the spot-beam. A fixed mirror 212 having a conic section 214 oriented along the optical axis is configured to redirect the spot-beam 204 to scan a circular pattern about and away from the optical axis 206 in a two-dimensional FOV. A ring amplifier 216 is positioned in a plane normal to the optical axis. The ring amplifier comprising one or more pumps 218 configured to pump a gain medium 220 in the form of a ring around the optical axis. In this embodiment, a plurality of mirrors 222, 224, 226, 22 and 230 are positioned fore and aft of the gain medium 220 to redirect the spot-beam 204 traveling along a transmission axis 231 (e.g., the X-axis) to enter and exit sidewall 232 of the gain medium and pass through the gain medium multiple times to amplify the spot-beam 204 and return the amplified spot-beam along transmission axis 230 to scan the circular pattern. The spot-beam 232 preferably enters and, after multiple passes through the gain medium, exits substantially perpendicular to the sidewalls so that the amplifier does not affect the beam shape or beam steering.

The combination of the LCWG and fixed conic mirror to steer and redirect a laser spot-beam provides many advantages over known steerable laser transmitters and active situational awareness sensors. The SWaP-C benefits of using a single laser to produce a spot-beam without mechanical or rotary scanning are considerable. The use of a scanned spot-beam significantly reduces atmospheric backscatter, thus improving SNR. Additionally, replacing mechanical scanning with solid-state steering via the LCWG provides considerable flexibility for operating the sensor. Whereas the mechanically or rotary scanned sensors are limited to continuously scanning the same 360° horizontal FOV over and over, the LCWG steered sensor may rapidly scan a 360° horizontal FOV with a specified vertical FOV or any portion thereof, jump discretely between multiple specific objects per frame, vary the dwell time on an object or compensate for other external factors to tailor the scan to a particular application or changing real-time conditions.

U.S. Pat. No. 8,380,025 entitled "Liquid Crystal Waveguide Having Refractive Shapes for Dynamically Controlling Light" assigned to Vescent Photonics, Inc. is hereby incorporated by reference. The patent discloses a LCWG that is configurable to form and scan a laser spot over a FOV in a frame time to provide a relative illumination for optical NUC of active mode image sensors. A time varying voltage is applied to the LCWG to modulate the liquid crystal material in order to form and position the laser spot according to the specified scan pattern. Liquid crystal waveguides dynamically control the refraction of light. Generally, liquid crystal materials may be disposed within a waveguide in a cladding proximate or adjacent to a core layer of the waveguide. In one example, portions of the liquid crystal material can be modulated to form refractive optical component shapes (e.g. lenses or prisms) in the cladding that interact with a portion (specifically the evanescent field) of light in the waveguide so as to permit electronic control of the refraction/bending, focusing, or defocusing of light as it travels through the waveguide.

In one example, a waveguide may be formed using one or more patterned or shaped electrodes that induce formation of such refractive shapes of liquid crystal material, or alternatively, an alignment layer may have one or more regions that define such refractive or lens shapes to induce formation of refractive or lens shapes of the liquid crystal material. The electrodes are positioned within the LCWG and orientated according to the shape of the LCWG core such that each electrode modulates the liquid crystal material for a different direction of steering (i.e. one electrode steers positive theta X, another steers negative theta X and a third steers in theta Y). In another example, such refractive shapes of liquid crystal material may be formed by patterning or shaping a cladding to define a region or cavity to contain liquid crystal material in which the liquid crystal materials may interact with the evanescent light. The LCWG controller includes command and synchronization electronics that receive a start of frame/row from a ROIC and generate analog drive signals that specify the scan pattern and a drive controller that converts the analog drive signals to a high frequency, high voltage drive signal applied to the LCWG. These command and synchronization electronics may also synchronize the pulses from the laser source.

A piecewise linear (PWL) approximation (P1) of a cone (C1 or CN1) is three dimensional geometric shape described by a base that is a polygon with 3 or more sides, an axis perpendicular to the base, an apex located on the axis and a surface that is the locus of straight lines from the apex to perimeter of the base. If the axis is located at the center of the polygon, the geometric shape is rotationally symmetric about the axis.

A cone (C1 or CN1) plus a powered optic (C2) is a three dimensional geometric shape described by a circular base, an axis perpendicular to the base, an apex located on the axis and a surface that is the locus of lines that curve in planes that are parallel to the axis from the apex to perimeter of the base. Because the mirror's surface is curved, the spot size is actually different at different locations on the mirror. This causes some distortions in the far field and extra beam divergence. Using an aspherical surface helps correct this. The effect is reduced with more apertures.

A PWL approximation of a cone (C1 or CN1) plus a powered optic (P2) is a three dimensional geometric shape described by a base that is a polygon with 3 or more sides, an axis perpendicular to the base, an apex located on the axis and a surface that is the locus of lines that curve in planes that are parallel to the axis from the apex to perimeter of the base.

A truncated cone (C3) is a three dimensional geometric shape described by a circular base, an axis perpendicular to the base, a top described by a circle and a surface that is the locus of straight lines parallel to the axis from the perimeter of the top to perimeter of the base.

A truncated PWL approximation of a cone (P3) is a three dimensional geometric shape described by a base that is a polygon with 3 or more sides, an axis perpendicular to the base, a top described by a polygon of 3 or more sides and a surface that is the locus of straight lines from the perimeter of the top to perimeter of the base.

A truncated cone plus a powered optic (C4) A three dimensional geometric shape described by a circular base, an axis perpendicular to the base that intersects the base in the center of the circle, a top described by a circle and a surface that is the locus of lines that curve in planes that are parallel to the axis from the perimeter of the top to perimeter of the base.

A truncated PWL approximation of a cone plus a powered optic (P4) A three dimensional geometric shape described by a base that is a polygon with 3 or more sides, an axis perpendicular to the base, a top described by a polygon of 3 or more sides and a surface that is the locus of lines that curve in planes that are parallel to the axis from the perimeter of the top to perimeter of the base.

Any of the above conical shapes can be combined to create an acceptable conical shape for the conic section of the fixed mirror (i.e. a polygon base with a curved surface formed by the locus of curved lines from the apex to the perimeter of the polygon base). Any of the above conical shapes may be combined with focusing optic L1.

Any of the above conical shapes are subject to manufacturing tolerances of the fixed mirror. A conical shape, such as a normal cone, that is designed to be rotationally symmetric about the axis may deviate from such symmetry within the manufacturing tolerances. Alternately, a conical shape may be designed with the axis intentionally offset from the center of the base (circle or polygon) in order to scan a particular FOV. Another alternative is to use the LCWG to vary Theta Z as a function of Phi in order to scan a particular FOV with any conical shape.

Referring now to FIGS. 5 and 6a-6d, an embodiment of a situational awareness sensor 300 includes a laser transmitter 302 steerable about a 360° horizontal field of a view, a ring amplifier 304 and a detector 306 responsive to the laser transmission wavelength.

Sensor 300 includes a housing 308 having four discrete apertures 310 formed about its circumference at 90° (360°/4) intervals. More generally, the number of apertures and spacing is dictated by the application. The housing comprises a structural member configured to provide support primarily in the direction parallel to the sensor axis.

A laser 311 is configured to generate a collimated spot-beam 312 at an input wavelength (e.g. a red laser at 1.06 micron) along an optical axis 314 that is oriented in the Z direction. A LCWG 316 is oriented along the optical axis and is responsive to command signals to steer the spot-beam 312 about the optical axis to a location Theta X 315 and Theta Y 317 from the optical axis where Theta X is the angle between the projection of the instantaneous location of the axis of the spot-beam on the X-Y plane and the Z-axis and Theta Y is the angle between the instantaneous location of the axis of the spot-beam and the Z-axis such that Theta X is in the plane of the X-axis and Theta Y is in the plane of the Y-axis. Theta Z 318 is the angle between the projection of the instantaneous location of the axis of the steered spot-beam and the Z-axis.

Because of the rotational symmetry, the position of the X axis is, more or less, arbitrary. In this description, X is parallel to the "in plane" steering direction of the waveguide and Y is parallel to the "out of plane" steering direction of the waveguide. Making X parallel to the in plane steering direction of the waveguide simplifies the description, but it does not have to be in this location, there is a straightforward transform to relate any choice of X to the in plane steering direction.

A controller 320 is configured to issue command signals to the LCWG 316 to steer the spot-beam 312 to the desired Theta X and Theta Y. A computer 322 is configured to issue signals to the controller 320 that provide the desired Theta X and Theta Y to implement a continuous scan, illumination of multiple discrete objects, variable dwell time, compensation for an external signal etc.

A fixed mirror 322 has a conical shape 324 that is oriented along the optical axis 314 (coincident with or offset from in different configurations) to redirect the spot-beam 312. In this particular configuration, conical shape 324 is a normal cone (CN1) that is rotationally symmetric about its axis, which is coincident with the optical axis 314. The tip of the cone is positioned towards the LCWG with the radius of the cone increasing along the axis away from the LCWG.

An optic L1 326 is configured to focus the collimated spot-beam 312 onto the conical shape of the fixed mirror, which in turn redirects the spot-beam 312. Optic L1 is suitably configured so that its focal point is at the conical shape of the fixed mirror. This creates the minimum spot size on the conical surface. Since the round beam is actually being projected onto a curved surface, there is distortion of the beam due to the mirror's surface. Keeping the spot small makes the spot project on a "localized flat" surface. Optic L1 could be integrated into conical shape 324.

Four optical channels 328 are positioned between fixed mirror 322 and a different one of the apertures 310 in the housing 308 to guide the redirected spot-beam 312 through the corresponding aperture 310 to a location Phi 330 and Theta Z' 332 where Phi is the angle between the projection of the instantaneous location of the axis of the redirected spot-beam on the X-Y plane and the X axis and Theta Z' is the angle between the projection of the instantaneous location of the axis of redirected spot-beam on the Z axis. Theta Z' 332 is greater than Theta Z 318. The redirected spot-beam 312 scans a FOV defined by the values of Phi and Theta Z'. Theta X' is the angle between the projection of the instantaneous location of the axis of the redirected spot-beam on the X-Y plane and the Z-axis and Theta Y' is the angle between the instantaneous location of the axis of the redirected and the Z-axis.

Each optical channel 328 comprises an optic L2 334 and an optic L3 335. Optic L2 is of larger diameter to collect light coming off the mirror at +/−45 degrees (nominally). A smaller optic is achieved using more and smaller apertures. Optic L2 is placed at approximately its focal length from the mirror to collimate the light. Optic L3 is a fast (low F/#, short focal length) lens that quickly causes the light to cross and diverge out of the aperture.

Steering spot-beam 312 in a circle (constant Theta Z) around the conical shape scans the redirected spot-beam 312 from one aperture 310 to the next around a 360° FOV in Phi. Varying the radius of the circle scans the redirected spot-beam 312 in a defined FOV in Theta Z'. The angle Theta F 336 of the conical shape 324 of fixed mirror 312 may or may not be configured such that the spot-beam 312 is redirected perpendicular to optical axis 314. When Theta F produces a Theta Z' perpendicular to the Z-axis, the situational awareness sensor has a two-dimensional band of coverage comprised of Phi and Theta Z' that is centered on the Z-axis along with the fixed mirror 46. Increasing or decreasing Theta F increases or decreases the nominal Theta Z', respectively. This shifts the two-dimensional band of coverage comprised of Phi and Theta Z' along the Z-axis.

Each optical channel 328 further comprises a portion 340 of an optically-pumped gain medium, which together form ring amplifier 304 about, and suitably offset, from fixed mirror 322. The portion 340 of optically-pumped gain medium amplifies the wavelength of spot-beam 312. Each channel comprises a system of mirrors designated by a single mirror 342 configured to redirect the spot-beam 312 to enter and exit through the sidewalls of portion 340 and pass back-and-forth through the gain medium multiple times.

A detector (not shown) is configured to sense a reflected component of the spot-beam at the output wavelength. The optical system is configured such that the reflected component does not return through the amplifier, which would amplify any noise and potentially damage the amplifier. The reflected component may be processed to provide an intensity of the illuminated object or a range to the illuminated object.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A laser device, comprising:
   one or more lasers configured to generate one or more collimated spot-beams;
   one or more beam steerers responsive to command signals to steer the one or more collimated spot-beams to scan a circular pattern in a two-dimensional field-of-view (FOV); and
   a ring amplifier comprising one or more pumps configured to pump a gain medium in the form of a ring, said ring amplifier configured such that said one or more collimated spot-beams pass through the gain medium one or more times to amplify the one or more collimated spot beams while preserving the steering of the one or more collimated spot-beams over the FOV.

2. The laser device of claim 1, wherein said one or more lasers and said one or more beam steerers comprise:
   a laser configured to generate a collimated spot-beam along an optical axis;
   a liquid crystal waveguide (LCWG) along the optical axis responsive to command signals to steer the collimated spot-beam in two-dimensions about the optical axis; and
   a fixed mirror having a conic section oriented along the optical axis that redirects the collimated spot-beam away from the optical axis to scan the circular pattern in the two-dimensional FOV.

3. The laser device of claim 1, wherein said one or more lasers and said one or more beam steerers comprise a plurality of optical phase arrays (OPAs).

4. The laser device of claim 1, said ring amplifier further comprising:

a plurality of mirrors positioned fore and aft of the gain medium to redirect the collimated spot-beam traveling along a path to enter and exit sidewalls of the gain medium and pass through the gain medium multiple times to amplify the collimated spot-beam and return the amplified collimated spot-beam along the path to scan the circular pattern.

5. The laser device of claim 4, wherein the plurality of mirrors comprises:
an entrance mirror configured to redirect the collimated spot-beam substantially perpendicular to a first sidewall of the gain medium;
a plurality of intermediate mirrors configured to redirect the collimated spot-beam to pass back-and-forth through the gain medium between said second and first sidewalls multiple times to amplify the collimated spot-beam before exiting the first sidewall; and
an exit mirror to redirect the amplified collimated spot-beam along the path to scan the circular pattern.

6. The laser device of claim 1, wherein said ring amplifier comprises a plurality of said one or more pumps spaced around the circumference of the ring of gain medium to pump a corresponding plurality of portions of said gain medium, said plurality of pumps responsive to pump command signals to pump only a first portion of the gain medium through which the collimated spot-beam is passing and a second portion of the gain medium through which the collimated spot-beam will next pass to scan the circular pattern.

7. The laser device of claim 6, further comprising:
a thermal controller configured to cool the gain medium, said thermal controller comprising a plurality of active thermal control sections spaced around the circumference of the ring of gain medium in an alternating arrangement between the plurality of pumps, said active thermal control sections responsive to cool only the pumped first and second portions of the gain medium as the collimated spot-beam scans the circular pattern.

8. The laser device of claim 1, wherein the ring amplifier comprising a cladding around the gain medium to suppress amplified spontaneous emission (ASE).

9. The laser device of claim 1, wherein the one or more beam steerers scan the one or more spot-beams to complete the circular pattern to complete a 360° FOV.

10. The laser device of claim 1, wherein said one or more beam steerers are configured to steer the one or more spot-beams normal to an axis in said circular pattern.

11. The laser device of claim 1, further comprising:
a detector configured to sense a reflected component of the spot-beam.

12. A laser device, comprising:
a laser configured to generate a collimated spot-beam at an input wavelength along an optical axis;
a liquid crystal waveguide (LCWG) along the optical axis responsive to command signals to steer the collimated spot-beam at the input wavelength in two-dimensions about the optical axis;
a controller configured to issue command signals to the LCWG to steer the collimated spot-beam;
a fixed mirror having a conic section oriented along the optical axis that redirects the collimated spot-beam to scan a circular pattern about and away from the optical axis in a two-dimensional field-of-view (FOV);
a ring amplifier in a plane normal to the optical axis, said ring amplifier comprising one or more pumps configured to pump a gain medium in the form of a ring around said optical axis, said gain medium having first and second sidewalls perpendicular to the optical axis; and
a plurality of mirrors positioned fore and aft of the gain medium to redirect the collimated spot-beam traveling along a path to enter and exit sidewalls of the gain medium and pass through the gain medium multiple times to amplify the collimated spot-beam and return the amplified collimated spot-beam along the path to scan the circular pattern.

13. The laser device of claim 12, wherein said plurality of mirrors comprises:
an entrance mirror configured to redirect the collimated spot-beam redirected along a path from the conic section substantially parallel to the optical axis through the first sidewall of the gain medium;
a plurality of intermediate mirrors fore and aft of the gain medium configured to redirect the collimated spot-beam to pass back-and-forth through the gain medium between said second and first sidewalls multiple times to amplify the collimated spot-beam before exiting the first sidewall substantially parallel to the optical axis; and
an exit mirror to redirect the amplified collimated spot-beam along the path to scan the circular pattern.

14. The laser device of claim 12, wherein said ring amplifier comprises a plurality of said one or more pumps spaced around the circumference of the ring of gain medium to pump a corresponding plurality of portions of said gain medium, said plurality of pumps responsive to pump command signals to pump only a first portion of the gain medium through which the collimated spot-beam is passing and a second portion of the gain medium through which the collimated spot-beam will next pass to scan the circular pattern.

15. The laser device of claim 14, further comprising:
a thermal controller configured to cool the gain medium, said thermal controller comprising a plurality of active thermal control sections spaced around the circumference of the ring of gain medium in an alternating arrangement between the plurality of pumps, said active thermal control sections responsive to cool only the pumped first and second portions of the gain medium as the spot-beam scans the circular pattern.

16. An optical amplifier, comprising
a ring element with a ring-shaped optical gain medium around an axis,
one or more pumps to optically pump the ring-shaped optical gain medium; and
a plurality of mirrors positioned fore and aft of the gain medium to redirect a collimated spot-beam traveling along a path away from the axis and scanning a circular pattern in a two-dimensional field-of-view (FOV) to enter and exit sidewalls of the gain medium and pass through the gain medium multiple times to amplify the collimated spot-beam and return the amplified collimated spot-beam along the path to scan the circular pattern.

17. The optical amplifier of claim 16, wherein the plurality of mirrors comprises:
an entrance mirror configured to redirect the collimated spot-beam substantially parallel to the axis through a first sidewall of the gain medium;
a plurality of intermediate mirrors configured to redirect the collimated spot-beam to pass back-and-forth through the gain medium between said second and first sidewalls multiple times to amplify the collimated spot-beam before exiting the first sidewall substantially parallel to the axis; and an exit mirror to redirect the amplified collimated spot-beam along the path to scan the circular pattern.

18. The optical amplifier of claim 16, wherein said ring amplifier comprises a plurality of said one or more pumps spaced around the circumference of the ring of gain medium to pump a corresponding plurality of portions of said gain medium, said plurality of pumps responsive to pump command signals to pump only a first portion of the gain medium through which the collimated spot-beam is passing and a second portion of the gain medium through which the collimated spot-beam will next pass to scan the circular pattern.

19. The optical amplifier of claim 18, further comprising:

a thermal controller configured to cool the gain medium, said thermal controller comprising a plurality of active thermal control sections spaced around the circumference of the ring of gain medium in an alternating arrangement between the plurality of pumps, said active thermal control sections responsive to cool only the pumped first and second portions of the gain medium as the collimated spot-beam scans the circular pattern.

20. The optical amplifier of claim 16, wherein the ring amplifier comprising a cladding around the gain medium to suppress amplified spontaneous emission (ASE).

* * * * *